United States Patent [19]

Schulhoff, Jr.

[11] Patent Number: 4,883,447

[45] Date of Patent: Nov. 28, 1989

[54] POWER TRANSMISSION BELT

[76] Inventor: Saul Schulhoff, Jr., 3502 Fallstaff Rd., Baltimore, Md. 21215

[21] Appl. No.: 136,202

[22] Filed: Dec. 21, 1987

[51] Int. Cl.$^4$ .......................... F16G 5/00; F16G 5/10; F16G 5/12

[52] U.S. Cl. .................................... 474/242; 474/265; 474/272

[58] Field of Search ............... 474/237, 238, 242, 249, 474/251, 270, 271, 272, 252, 204, 205, 265; 198/850

[56] References Cited

U.S. PATENT DOCUMENTS

| | | | |
|---|---|---|---|
| 1,394,018 | 10/1921 | Jackson | 474/268 |
| 2,322,466 | 6/1943 | Perry | 474/242 |
| 2,461,169 | 2/1949 | Miller | 474/251 |
| 2,775,902 | 1/1957 | Rush | 474/251 |
| 3,091,030 | 5/1963 | Zumbrunnen | 474/203 X |
| 3,808,901 | 5/1974 | Berg | 474/242 |
| 4,084,687 | 4/1978 | Lapeyre | 198/850 X |
| 4,213,350 | 7/1980 | Horowitz et al. | 474/265 X |
| 4,662,863 | 5/1987 | Sloniewsky | 474/251 |

Primary Examiner—Stephen J. Novosad
Attorney, Agent, or Firm—Saidman, Sterne, Kessler & Goldstein

[57] ABSTRACT

The present invention provides a power transmission belt for transferring power between two power transfer members. The belt includes a resilient binder and a plurality of traction blocks spaced apart from one another and formed integrally with the binder. The traction blocks are formed from a dense, abrasion-resistant material for bitingly and frictionally engaging a wall of the power transfer members. The binder is preferably formed from an elastomeric material. Preferably, the belt has a substantially V-shaped cross section and the traction blocks extend laterally outwardly from at least one of the side walls of the belt.

17 Claims, 2 Drawing Sheets

POWER TRANSMISSION BELT

BACKGROUND OF THE INVENTION

1. Field of the Invention

The present invention relates to belts for transmitting power from one member to another. More particularly, the invention relates to V-belts which are adapted to be received in the channels of pulleys.

2. Description of the Related Art

Flexible power transmission belts typically comprise an assembly of superimposed strips. One example of such a transmission belt is disclosed in U.S. Pat. No. 3,720,113. In this patent, the belt includes a plurality of superimposed steel strips and a plurality of V-shaped solid metal blocks. The blocks are provided with lateral guides having relatively short top edges which override the steel strips to maintain the strips and blocks in a predetermined relationship.

U.S. Pat. No. 4,342,561 discloses a power transmission belt having a laminated structure comprising steel bands, rubber layers, and steel wire layers. The assembly is treated to cure the elastomer layers so that liquid elastomer flows into the perforations of the steel strip bands and around each of the winds of the wire layers. Trapezoidal drive blocks may be attached to the composite belt in a conventional manner. However, these drive blocks are additions to rather than integral parts of the drive belts.

A torque transmission belt having a plurality of alternating non-compressive primary blocks and elastomeric secondary blocks is disclosed in U.S. Pat. No. 4,433,965. The primary blocks are made from a hard material such as steel, whereas the secondary blocks are formed from an elastic material such as rubber. Both the primary and the secondary blocks are connected to one another by a metallic ring comprising a plurality of superimposed metallic strips. The ring extends between upwardly extending block projections and is secured in position by a plate mounted within grooves formed in the upper surface of each block. However, this arrangement has the inherent disadvantage of requiring a separate member to interconnect the blocks to one another.

The belts of the prior art suffer from the drawback of inherent complexity resulting from their laminate constructions and the provision of "add-on" traction blocks. Further, none of the above-described belts is designed for running in a liquid such as oil to provide for belt cooling despite the friction requirement for belt operation. Such cooling would have the benefit of prolonging belt life by lessening the temperature of the belt during operation and retarding the occurrence of "dry rot" which sometimes occurs with belts over the course of time.

Accordingly, it is an object of the present invention to provide a power transmission belt which is relatively simple in design and is inexpensive to manufacture.

Another object of the present invention is to provide a power transmission belt that is capable of operating for extended periods of time without breakdown.

Yet another object of the present invention is to provide a power transmission belt having a considerably longer life span that prior art transmission belts.

Still another object of the present invention is to provide a power transmission belt capable of being cooled by passage through a cooling fluid such as oil while still providing for power transmission to a driven member.

SUMMARY OF THE INVENTION

A power transmission belt is provided having a resilient binder and a plurality of traction blocks spaced apart from one another and formed integrally with the binder. The traction blocks are formed from a dense, abrasion-resistant material for bitingly and frictionally engaging a wall of a power transferring member. The binder is preferably formed from an elastomeric material. Preferably, the belt has a substantially V-shaped cross section and the traction blocks extend laterally outwardly from at least one of the side walls of the belt to engage the wall of the power transfer member. In one embodiment, the belt is reinforced by a plurality of cords extending through corresponding apertures formed in the traction blocks and the binder.

BRIEF DESCRIPTION OF THE DRAWINGS

The foregoing and other objects, aspects, uses and advantages of the present invention will be more fully appreciated as the same become better understood from the following detailed description of the present invention when considered in connection with the accompanying drawings, in which.

DETAILED DESCRIPTION OF THE PREFERRED EMBODIMENT

Figure 1:
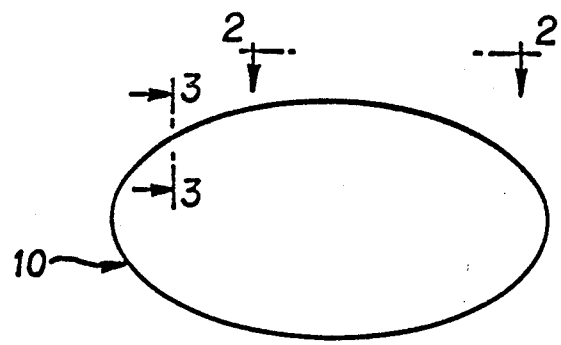
FIG. 1 is a side view of a power transmission belt.
Figure 2:
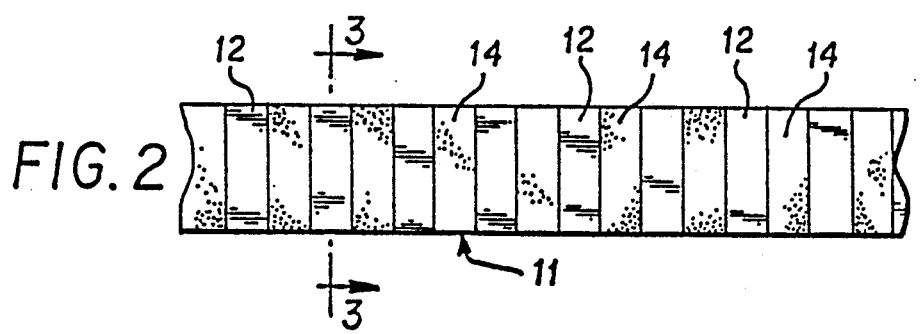
FIG. 2 is a top view of the belt along the line 2—2 of FIG. 1.
Figure 3:
FIG. 3 is a cross-sectional view along the line 3—3 of the belt depicted in FIG. 1.

Referring now to the drawings, wherein like reference numerals denote like or similar elements throughout the several views, and particularly to FIGS. 1-3, a power transmission belt is designated generally at 10. The belt 10 comprises a band 11 having a plurality of traction members or blocks 12 spaced apart from one another and positioned within a resilient binder 14. The traction members 12 may be made from any suitable hard material such as metal, plastic or nylon. The binder 14 is preferably formed from a less dense elastomeric material that is sufficiently flexible yet rigid enough to support the traction members 12 during the course of power transmission to a driven member, as will be described in detail below. Preferably, the belt 10 has somewhat of a V-shaped cross-sectional configuration (see FIG. 3) so as to facilitate power transmission between the belt 10 and a power transferring member such as a pulley 16 (see FIG. 6).

Figure 4:
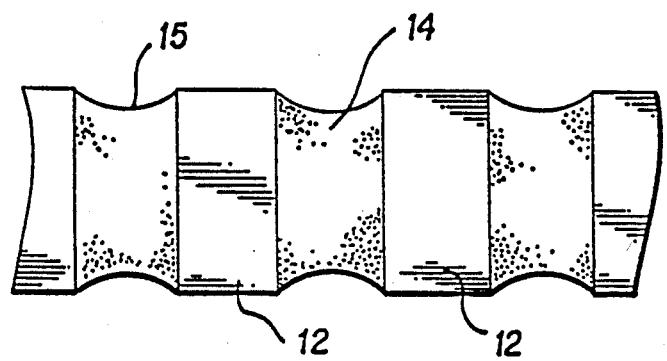
FIG. 4 is a top view of one embodiment of the power transmission belt of the present invention.
Figure 5:
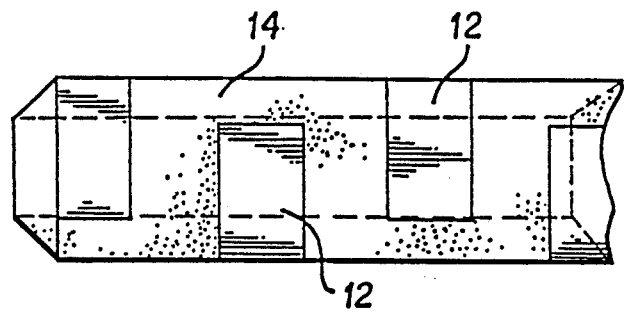
FIG. 5 is a top, perspective view of another embodiment of the power transmission belt of the present invention.

FIGS. 4 and 5 depict various configurations for the orientation of traction members 12 within the resilient binder 14. In FIGS. 4 and 5, the traction blocks 12 are spaced equidistantly from one another by the binder 14.

However, this equidistant spacing is not required. The blocks may extend across the entire width of the belt, as shown in FIG. 4, or may extend only partially thereacross, as shown in FIG. 5. Depending upon the type of elastomer used, recesses or inwardly turned shrinkage zones 15 may occur as a result of curing during belt formation. Recesses 15 may be included as a design feature of the belt so as to minimize the effect of elastomer engagement with the member driven by the belt. These recesses 15 facilitate belt flexibility and traction block-side wall engagement. Preferably, driving power is provided through the traction blocks 12, which bitingly and frictionally engage a driven member such as a pulley to transmit power. That is, in addition to frictionally engaging the pulley, the traction blocks bite or dig into the pulley walls to further engage the pulley and effect power transfer. This arrangement increases the efficiency of power transfer, as less energy is lost to frictional heat, and provides for a more durable power transmission belt.

Figure 6:
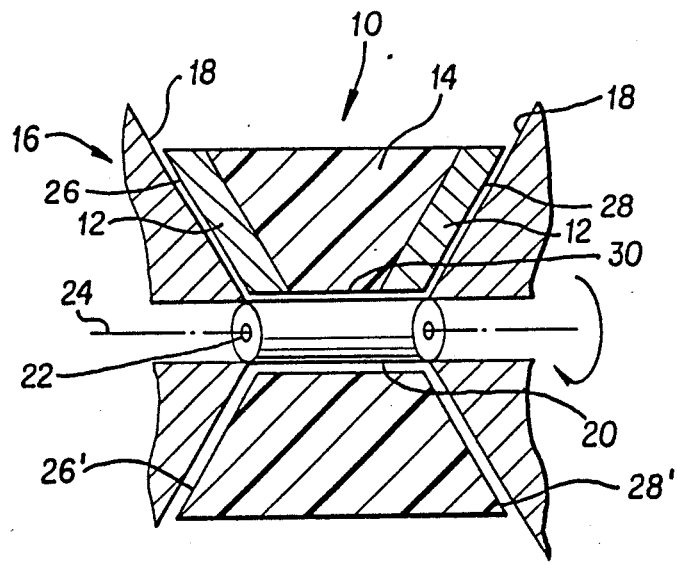
FIG. 6 is a cross-sectional view of another embodiment of a power transmission belt positioned within a pulley.

With reference to FIG. 6, one embodiment of the power transmission V-belt of the present invention is shown in position in a pulley 16. The pulley 16 includes laterally and radially outwardly extending side walls 18 between which the belt 10 is positioned. The center portion or hub 20 of the pulley defines an annular passage 22 through which shaft 24 may be coupled to a member (not shown) which either provides or receives rotational driving power from the belt 10. Side walls 26, 28 of the belt 10 are shaped correspondingly to the side walls 18 of the pulley 16. As is shown in the drawing, side walls 26, 28 of the belt portion above the shaft 24 are closer to the side walls 18 of the pulley 16 than are the side walls 26', 28' of the belt portion below the shaft 24. That is, a smaller gap exists between each side wall 26, 28 and the pulley side wall 18 than that which exists between each side wall 26', 28' and the pulley side wall 18. The reason for this discrepancy in separation distance between the belt side walls and the pulley side wall is due to the provision of traction blocks 12 at each side wall 26, 28 of the belt portion depicted above the axle 24. In contrast, the belt portion (as shown) positioned below the axle 24 consists solely of elastomeric binding material 14. Because the traction blocks extend radially outwardly from the belt 10 to bitingly and frictionally engage the side walls 18 of the pulley 16 in the manner discussed above, the space between the blocks 12 and pulley side walls 18 is necessarily small, and is exaggerated in the drawings for the sake of clarity.

A suitable cooling fluid such as oil may be provided between belt-pulley contact surfaces to facilitate belt cooling during the course of belt operation in such systems as vari-speed drive systems. The provision of a cooling and/or lubricating fluid has the added benefit of keeping the belt 10 in a moist condition, thereby further increasing the durability of the belt.

Figure 7:
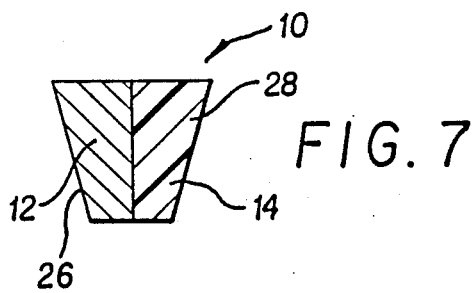
FIG. 7 is a cross-sectional view of another embodiment of the power transmission belt.

FIG. 7 depicts another embodiment of the present invention, wherein a traction block 12 is positioned along only one of the two side walls 26, 28. This arrangement may be desirable in applications where the belt 10 extends along a curved or twisted course where only one of the two sides of the belt bitingly and frictionally engages a side wall of a pulley.

Figure 8:
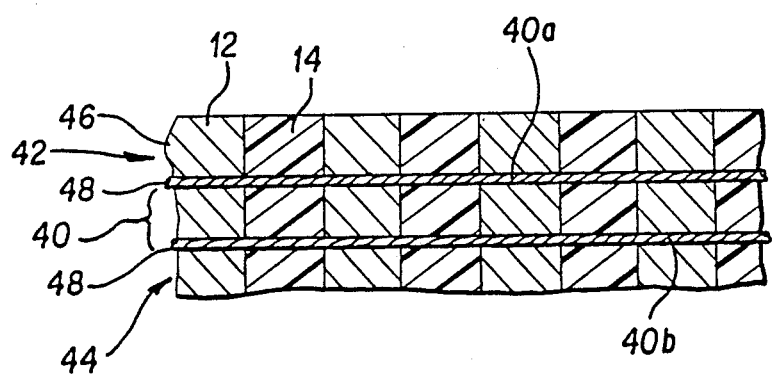
FIG. 8 is a sectional side view of still another embodiment of a power transmission belt.

FIG. 8 depicts another embodiment of the power transmission belt 10 in which the belt is reinforced by a plurality of cords or rods 40 formed from a suitably stiff but flexible material such as wire. Preferably, at least two cords 40 are provided, one cord 40a extending along an upper belt portion 42 and the other cord 40b extending along a lower belt portion 44. However, other arrangements, such as a plurality of rows of cords extending through the upper and lower belt portions 42 and 44, respectively, may also be used to obtain the desired degree of belt reinforcement. The cords 40 extend through apertures 46 formed in the traction members 12 and corresponding apertures 48 formed in the binder to reinforce the belt 10 along its length.

The principles, preferred embodiments and modes of operation of the present invention have been described in the foregoing specification. The invention which is intended to be protected herein should not, however, be construed as limited to the particular forms disclosed, as these are to be regarded as illustrative rather than restrictive. Variations and changes may be made by those skilled in the art without departing from the spirit of the invention. Accordingly, the foregoing detailed description should be considered exemplary in nature and not limited to the scope and spirit of the invention as set forth in the attached claims.

What is claimed is:

1. A belt for transmitting power, comprising:
  a band formed of a resilient binder;
  a plurality of traction members spaced apart from one another, said traction members being formed integrally within said resilient binder;
  said traction members being formed at least in part from a dense, abrasion-resistant material;
  said traction members having a density greater than that of said resilient binder said belt having at least two side walls; said traction members extending laterally outwardly from said resilient binder; and
  said binder comprising at least one of said side walls.

2. A belt according to claim 1, wherein said traction members and said binder form an endless belt member.

3. A belt according to claim 1, wherein the belt has at least two side walls, at least a part of one said side walls being formed from said traction members.

4. A belt according to claim 3, wherein said belt has a substantially V-shaped cross-section.

5. A belt according to claim 1, wherein said traction members and said binder include means for reinforcing the belt.

6. A belt according to claim 1, wherein each of said traction members comprises a base portion and at least two side portions, said side portions extending upwardly and outwardly from said base portion and outwardly from said resilient binder.

7. A belt according to claim 1, wherein said resilient binder is formed from an elastomeric material.

8. A belt for transmitting power, comprising:
  a band formed of a resilient binder;
  a plurality of traction members spaced apart from one another, said traction members being formed integrally within said resilient binder;
  said traction members being formed at least in part from a dense, abrasion-resistant material;
  said traction members having a density greater than that of said resilient binder; and
  said traction members extending substantially transversely across and laterally outward from said resilient binder.

9. A belt according to claim 8, wherein the belt has a substantially V-shaped cross-section.

10. A belt according to claim 9, wherein the belt has a top portion and a base portion, said traction members extending substantially between said top and said base portion.

11. A belt according to claim 8, wherein said traction members are formed from metal.

12. A belt according to claim 8, wherein said traction members are formed from a dense, synthetic material.

13. A belt according to claim 8, wherein said binder is formed from an elastomeric material.

14. A belt according to claim 8, wherein each of said traction members and said binder includes an aperture extending therethrough, a cord extending through said aperture for reinforcing the belt.

15. A belt for transmitting power, comprising:
a band formed of a resilient binder;
a plurality of traction members spaced apart from one another, said traction members being formed integrally within said resilient binder;
said traction members being formed at least in part from a dense, abrasion-resistant material;
said traction members having a density greater than that of said resilient binder, said belt including reinforcing means wherein, each of said traction members and said resilient binder includes an aperture extending therethrough;
said belt reinforcing means comprising a cord extending through said aperture; and
said belt having a substantially V-shaped cross-section, wherein each of said traction members extend laterally outwardly from said resilient binder.

16. A belt according to claim 15, wherein at least a part of each of said plurality of traction members bitingly and frictionally engages a member in power transfer relationship with the belt.

17. A belt for transmitting power according to claim 15, wherein said binder is formed from an elastomeric material and said traction members are formed from metal.

* * * * *